801X
Wheatley & Beaumont,
Making Store-Pipe, &c.
Patented Nov. 4, 1807.
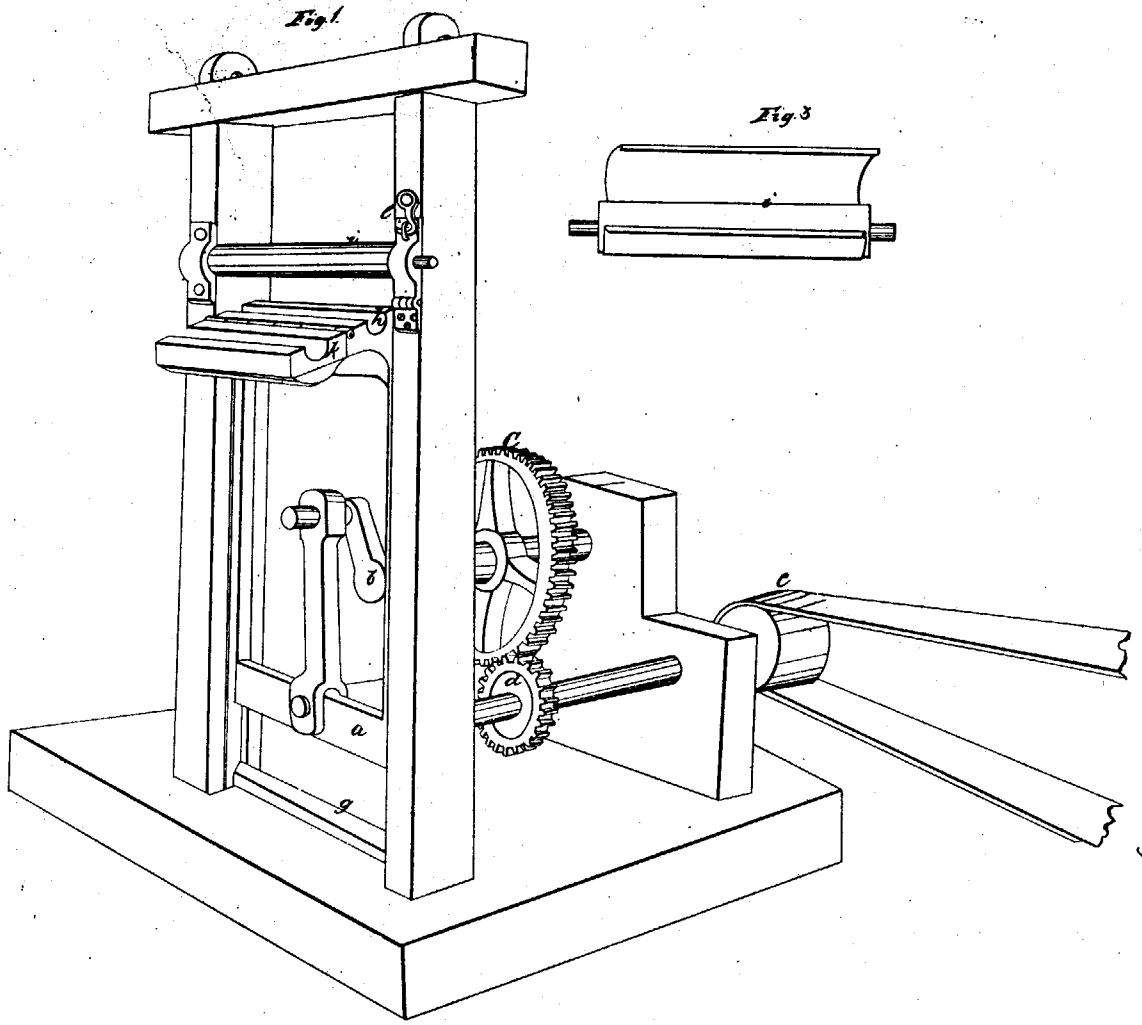
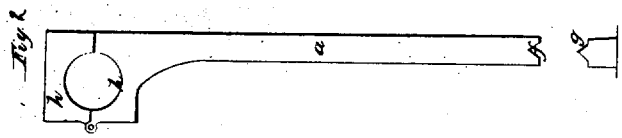
N. PETERS, PHOTO-LITHOGRAPHER, WASHINGTON, D. C.

801X

Richard Wheatley & James Beaumont
Letters Patent Dated November 4. 1807

The Schedule referred to in these Letters Patent, and making part of the same, containing a Description in the words of the said Richard Wheatley and James Beaumont themselves of their machine for manufacturing sheet Iron into Funnel for Stove pipe or other purposes.

An Iron frame is fixed in a wooden one so as to slide up & down when compelled thereunto by a crank, which crank is turned round by a large cast iron wheel by means of a smaller one to give additional power. These are turned from a water wheel by a Pulley, or may be turned by a winch by one or more men. In the under side of the upper part of the sliding frame is an angular groove & there is a piece of hard iron or steel fixed to the wooden frame, whose upper side is of an angular form, of the same dimensions as the angular Groove, so that when the said sliding frame is at the lowest position the the Groove comes on to it. This is for crooking the edges of the sheet Iron. On the top side of the upper part of the said sliding frame there is a concave part in the form of half a circle, & to the wooden Frame above the sliding frame is fixed a cast iron roller of the same dimensions, which when the said sliding frame is at its highest position bolts up against the said roller, this forms the sheet iron half round, then there is another concave part fixed to the last mentioned one by hinges which is turned over by a lever, which closes the edges of the sheet Iron together, and forms it into a Funnel. The cast Iron roller is fixed fast at one end by a projection, the

801 X other end is fixed by a Bolt & when the Tunnel is finished the Bolt is taken out and the Tunnel is slipped off at the end through the Frame.

N.B. The wheels and frame may be made of Iron, wood or mixed metals.

Witnesses:
Cuthbert Greenwood
John Bottomley

Richard Wheatley
James Beaumont

Received & Recorded a new Aug. 10th 1844

Eng
JPH